INVENTOR.
ARTHUR H. YOUMANS

Aug. 21, 1956   A. H. YOUMANS   2,760,078
CONDUCTION COUNTER FOR RADIOACTIVITY WELL LOGGING
Filed May 27, 1952   3 Sheets-Sheet 2
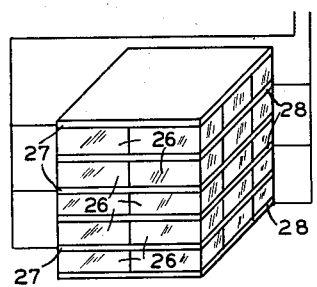
Fig. 3
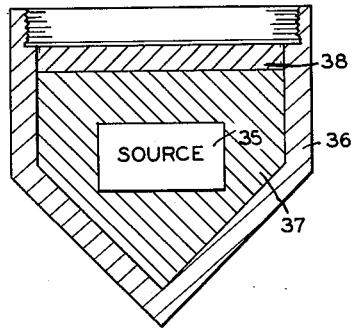
Fig. 4
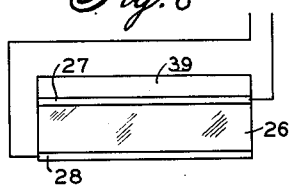
Fig. 5
Fig. 6
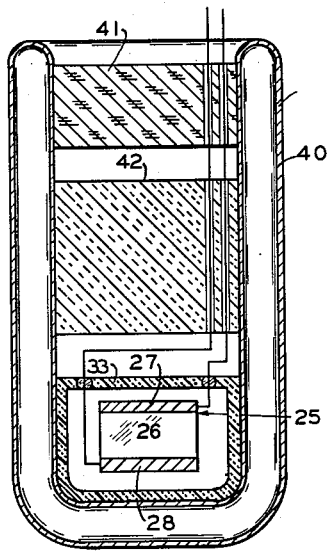
Fig. 7
INVENTOR.
ARTHUR H. YOUMANS
BY
ATTORNEY

INVENTOR.
ARTHUR H. YOUMANS

United States Patent Office
2,760,078
Patented Aug. 21, 1956

2,760,078

CONDUCTION COUNTER FOR RADIOACTIVITY WELL LOGGING

Arthur H. Youmans, Tulsa, Okla., assignor to Well Surveys, Incorporated, Tulsa, Okla., a corporation of Delaware Application May 27, 1952, Serial No. 290,274

6 Claims. (Cl. 250—83.3)

This invention relates to the art of geophysical prospecting and more particularly to the art of radioactivity well logging, wherein conduction type counters having solid or liquid conduction media are used to detect radiation.

It is old in the art to log oil wells by measuring the natural radioactivity of the strata or by irradiating the strata adjacent the drill hole with fast neutrons or penetrating gamma radiation and simultaneously traversing the well with a gamma ray or neutron detector or both. Such detectors have been of the type which employs a gaseous ionizable medium and produces electrical pulses or continuous current. In contrast, this invention contemplates the use of solids and liquids as detection media for radioactivity well logging.

Certain normally non-conducting solids and liquids conduct electrons when subjected to ionizing radiation. Counters having solid or liquid conduction media have certain advantages over gaseous detectors. Their greater density permits a smaller size detector which is desirable in the small space available in a well logging instrument. Their low resolving time permits high speed counting, their high efficiency provides a good signal to noise ratio, and their high stopping power is useful in gamma ray and high energy particle detection. The solid and liquid conducting type detector also has the advantage of being linear, that is, pulse height is proportional to the incident particle energy. Linearity is desirable for spectroscopy. In order that counters be linear, the particle must lose all its energy within the counter. An energetic beta particle does not lose all its energy in a gas counter unless a high pressure or a large volume is used; however, solid or liquid media stop high energy beta particles in the small distance available in a well logging instrument.

The conduction type counter has advantages over the recently developed scintillation counter which also uses a solid or liquid detection medium, the scintillation counter depending upon a photomultiplier having multiple amplification stages. Having fewer stages of amplification, the conduction type counter is not so voltage dependent. The scintillation counter is also critically dependent upon temperature, being very difficult to operate under the high temperatures found in some wells. On the other hand, some conduction type counters operate best at high temperatures. Since the conduction type counter involves only a solid or liquid conduction medium between a pair of electrodes, construction is extremely simple. It is impossible to detect all the light produced in a scintillation counter crystal, but all the ionization produced in a crystal counter adds to the signal.

Therefore, this invention resides in the adaptation of solid or liquid conduction type counters to the art of radioactivity well logging whereby neutrons, gamma rays, or both may be measured as an index to the formations penetrated by the well, including the provision of temperature control means for the conducting type counters, and means to depolarize the detector so that the height of the pulses due to radiation detection will be maintained.

The primary object of this invention is to provide a method and apparatus for making a well log by detecting radiation in the well with a conduction counter. Another object is to adapt a conduction counter to use in a drill hole of restricted lateral dimensions for detecting radiation. A still further object of this invention is to provide means for protecting a conduction counter, when used in a subsurface well surveying instrument, from the effects of temperature variations. Another object of this invention is to provide means for depolarizing a conduction counter used in a subsurface well surveying instrument. Still another object is to provide a method and apparatus for selectively detecting neutrons or gamma rays emanating from the formations surrounding a drill hole. Other objects and advantages of the present invention will become apparent from the following detailed description when considered in conjunction with the accompanying drawings, in which:

Figure 3 shows a modified form of the conduction counter shown in Figure 2;

Figure 4 is an enlarged vertical sectional view of a radiation source sub adapted to be attached to the bottom of the instrument shown in Figure 2;

Figure 5 shows a modified form of the conduction counter shown in Figure 2 adapted to detect neutrons;

Figure 6 shows still another modification of the conduction counter shown in Figure 2 adapted to detect neutrons;

Figure 7 shows a means of temperature control;

Figures 1, 2:
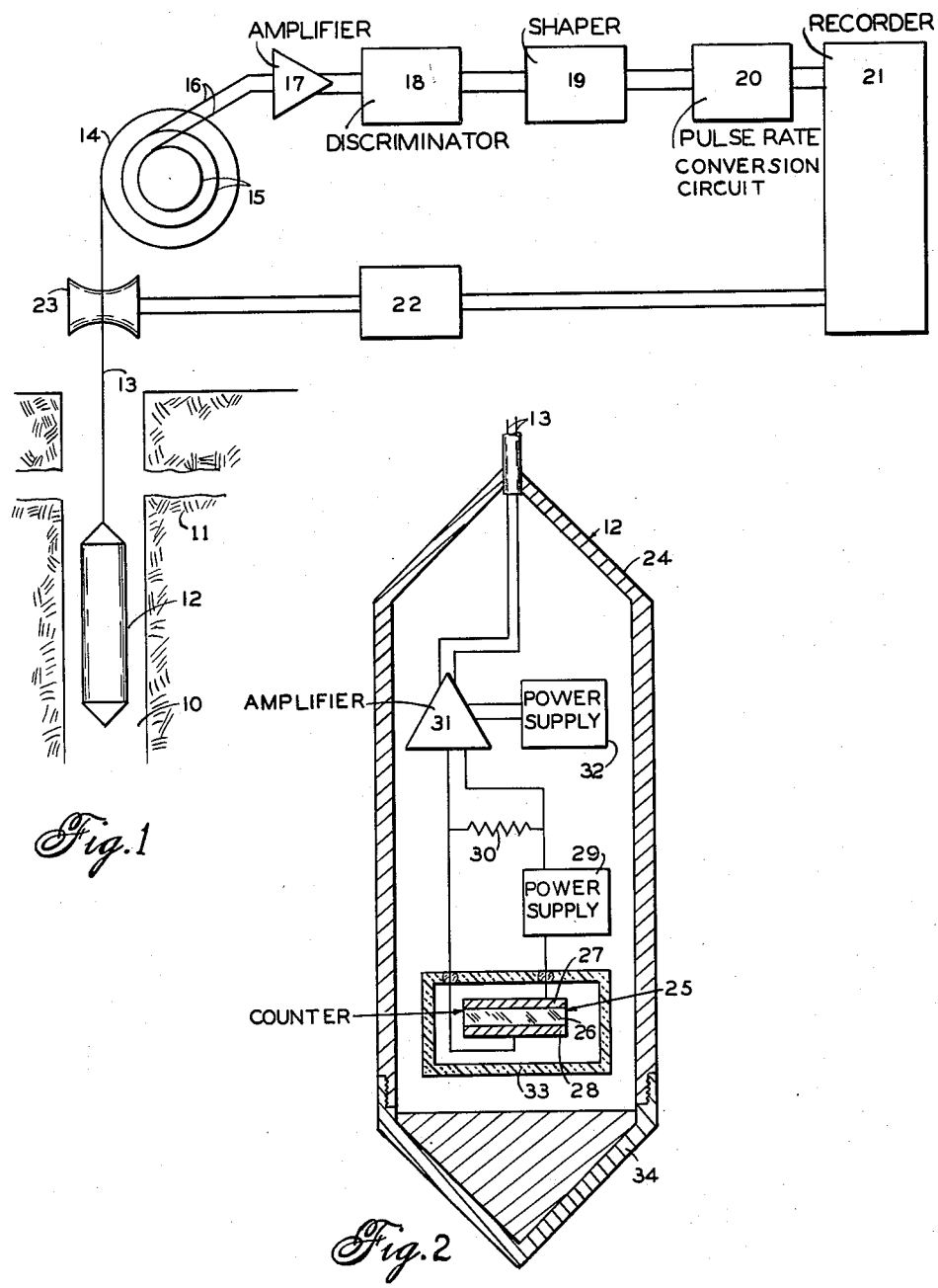
Figure 1 is a diagrammatic illustration of a geophysical well logging operation.
Figure 2 is an enlarged vertical sectional view of one form of the subsurface instrument.

In the art of radioactivity well logging, certain logs are made by measuring the gamma radiation naturally emitted by the well. The weakness of this radiation has made it customary in the art to use extremely complicated electrical circuits and bulky gaseous detectors in order to produce proportionally related electrical signals of sufficient intensity that they can be transmitted to the surface and recorded. The crystal conduction counter involves simpler circuits and provides a compact instrument of high efficiency and low resolving time. Other radioactivity logs are made by irradiating the formations adjacent the drill hole with neutrons or gamma rays and detecting neutrons or gamma rays influenced by the formations. In Figure 1, of the drawings, there is illustrated a well surveying operation in which any of these logs may be made.

A well 10 penetrates the earth's surface 11 and may or may not be cased. Disposed within the well is subsurface instrument 12 of the well logging system. Instrument 12 houses the conduction counter detector. Cable 13 suspends the instrument 12 in the well and electrically connects the instrument with the surface apparatus. The cable is wound on or unwound from drum 14 in raising and lowering instrument 12 to traverse the well. Through slip rings 15 and brushes 16 on the end of the drum, the cable is electrically connected to amplifier 17. A signal arising in subsurface instrument 12 is amplified by amplifier 17 and transmitted to discriminator 18 which establishes a threshold for determining which signals are to be transmitted further for recording. The signal applied to discriminator 18 includes pulses produced in the subsurface instrument as the result of neutron or gamma radiation and random pulses such as amplifier noise. Discriminator 18 may be regulated in a manner well-known in the art to pass for recording only pulses above a selected magnitude. This eliminates the small random noise pulses (as well as signal pulses which are below the noise level) and passes pulses resulting from the detection of neutrons or gamma rays. Discriminator 18 may alternatively take the form of a pulse height selector and pass only pulses of certain ranges of magnitudes; in this case, spectral analysis of the signal is possible. The signal pulses passed by discriminator 18 are shaped by shaper 19 so that each pulse has the same effect as any other pulse upon pulse rate conversion circuit 20 which functions in a conventional manner to produce a direct-current voltage that varies in magnitude in accordance with the rate of occurrence of pulses fed to it. The direct-current voltage is recorded by recorder 21. Recorder 21 is driven through transmission 22 by measuring reel 23 over which cable 13 is drawn so that recorder 21 moves in correlation with depth as instrument 12 traverses the well.

Subsurface instrument 12 shown in Figure 1 may take the form illustrated diagrammatically in vertical section in Figure 2. The instrument as shown in Figure 2 is adapted for use in making a log of a drill hole by measuring the natural radioactivity emitted by the formations. Instrument 12 comprises a housing 24 which encloses a conduction counter 25. Conduction counter 25 comprises a crystal 26 and conducting plates 27 and 28. A direct-current voltage is applied by power supply 29 through resistor 30 to the plates 27 and 28 of conduction counter 25. The output signal of conduction counter 25 appears across resistor 30 and is amplified by amplifier 31 and sent to the surface through cable 13. Power is supplied to amplifier 31 from power supply 32. It is to be understood that power supplies 29 and 32 may be replaced by suitable transformers and rectifiers which are supplied with power through the cable 13 from the surface of the earth.

In conducting a survey of a drill hole while using the apparatus illustrated in Figure 2, the instrument 12 is caused to traverse the formations penetrated by the well. Gamma radiation emitted by the formations impinges upon the crystal 26 of the conduction counter 25. Crystal 26 is made of material which is normally non-conductive but which becomes conductive when subjected to ionizing radiation. Such materials include diamond, sapphire, cadmium sulfide, zinc sulfide, silver chloride, silver bromide, lithium chloride-silver chloride and thallium bromide-thallium iodide. Liquid and solid argon also exhibit this counting property. When gamma rays strike crystal 26 they may be stopped by atoms of the crystal and thereupon produce electrons which ionize other atoms of the crystal. The field produced by the voltage applied to plates 27 and 28 accelerates the electrons toward the positive plate. The motion of the electrons toward the positive plate produces current pulses through resistor 30. These current pulses through resistor 30 produce voltage pulses which are amplified by amplifier 31 and sent to the surface to be further amplified, shaped, converted into a direct-current voltage and recorded in correlation with the depth at which it is produced.

The voltage applied to plates 27 and 28 depends upon the size and material of the crystal. A field of approximately 2000 volts per centimeter is desirable.

The larger the crystal used, the more efficient the detector, for more gamma rays can be stopped by a larger crystal. Convenient counting materials are ordinarily found in small crystals, although silver chloride, silver bromide, thallium bromide-thallium iodide, and lithium chloride-silver chloride may form larger crystals. These materials must be kept at very low temperatures in order to count. Diamond, sapphire, zinc sulfide and cadmium sulfide, may be used to count at higher temperatures; however, the best of these counting materials are found only in small crystals. Diamonds make perhaps the best counters. A typical diamond counter crystal is one millimeter thick and five millimeters across.

In order that conduction counter 25 efficiently detect gamma rays, it may take the aggregated form shown in Figure 3, wherein a number of crystals 26 are aggregated and plates 27 and 28 are placed alternately between layers of crystal. Gamma rays may be stopped anywhere in the crystal. Hence, it makes no difference from which direction the gamma rays impinge. It is, therefore, desirable to apply voltage across the smallest dimension of the crystal in order that the smallest voltage may produce a given field. The detector should be oriented so that gamma rays traverse the longest dimension of the crystal in order that they are more likely to be stopped within the crystal. This latter is particularly true when only a single crystal rather than an aggregate of crystals is used in the counter.

In order that gamma rays not be stopped appreciably by plates 27 and 28 and in order that the electrons produced by the stopping of gamma rays may pass through the plates 27 and 28 and produce ionization in more than one crystal in the form of the invention shown in Figure 3, plates 27 and 28 should be very thin, of the order of a few atoms in thickness; such thin plates may be made by evaporating silver upon the crystal surfaces.

The crystals must be maintained in a pure state in order to count or have certain desirable impurities. The surfaces must not be contaminated. To prevent such contamination, the counter may be mounted in an evacuated chamber formed by wall 33. The chamber may be filled with an inert gas such as a noble gas. Alternatively the crystal may be coated with an inert protective coating. The gas or coating must be non-conductive and must not become conductive when subjected to ionizing radiation; the gas or coating must in no way react with the crystal. The evacuated chamber also serves to insulate the crystal thermally.

The instant invention as described thus far, finds equal application when using a source of radiation. In operation, the subsurface device illustrated in Figure 3, may be modified to include a radiation source by removing the bottom portion 34 of the housing thereof, and replacing it with the sub shown in Figure 4 which carries the radiation source 35. If source 35 emits both neutrons and gamma rays and only neutrons are desired, then the sub shown in Figure 4 comprises the housing 36 which encloses a high density gamma ray absorber 37 in which is embedded radiation source 35. It will be desirable to interpose between the radiation source and the counter, a neutron absorbing shield 38. If source 35 is a gamma ray source, absorber 37 is omitted, and absorber shield 38 may be made of a high density material to stop direct passage of gamma rays from source to counter. The apparatus resulting from the combination of the devices illustrated in Figures 2 and 4 is adapted for use in making a neutron-gamma-ray log, that is, a log of gamma radiation produced by neutron interactions in the formations. In this instance, the source of radiation 35 is one which emits neutrons. A gamma-gamma log, that is, one made by irradiating the formations with penetrating gamma radiations and detecting gamma radiations influenced by the formations, can also be made without modifying the detecting or recording system. In this instance, the radiation source 35 is one which emits penetrating gamma radiations.

The conduction counter is readily adapted to detect neutrons. If cadmium sulfide is used, for crystal 26, the counter is sensitive to neutrons, for cadmium captures neutrons and thereupon emits gamma rays which may be detected as described above. If lithium chloride-silver chloride is used for crystal 26, the counter is also sensitive to neutrons, for lithium captures neutrons and thereupon emits alpha particles which ionize atoms in the crystal and produce current pulses as described above with regard to gamma ray detection.

An alternative scheme for detecting neutrons is illustrated in Figure 5. This form of the invention differs from that shown in Figure 2 in that a coating 39, of neutron capturing material, is formed on plate 27. This neutron capturing material may be boron or lithium. Boron or lithium absorbs slow neutrons and thereupon emits alpha particles. Plate 27 must be so thin that the alpha particles may penetrate the conducting layer and enter crystal 26 to produce ionization. Plate 27 should be the negative plate in order that the electrons produced upon ionization may be attracted to plate 28. The ionization produced by the alpha particles will occur near plate 27. If plate 27 were positive, the electrons produced upon ionization would be attracted thereto and would travel only a short distance before being collected. The current occasioned by the collection of electrons depends upon the distance traveled by electrons; therefore, the contribution to the current by particular electrons depends upon where in the crystal the electrons are freed. In order that all of the electrons contribute substantially equally to the current, they must travel approximately the same distance before being collected; therefore, it is desirable that ionization occur near one plate and that the electrons be collected at the distant plate. Coating 39 may be made of other neutron reactive materials such as cadmium or gadolinium which absorb slow neutrons and thereupon emit gamma radiation to which the crystal counter is sensitive as described above. If coating 39 is made of uranium, the uranium may capture neutrons and undergo fission; the fission fragments cause ionization in crystal 26 thereby producing a current as described above. A more efficient neutron detector is made by an aggregate of counters as shown in Figure 6. In Figure 6 the crystals 26 are disposed end to end. The aggregate detector is of thin cross-section in order to permit discrimination in favor of neutron pulses and against gamma ray pulses.

Where the dimensions of the crystal are small the counter may be made selectively sensitive to neutrons rather than gamma rays. The small dimension of the crystal may be of the order of 0.2 millimeters, depending upon the crystal material. In this case, the coating 39 must be of material that produces alpha particles or fission fragments upon neutron capture. Alpha particles or fission fragments are readily stopped in a very small crystal whereas, gamma rays are unlikely to be stopped by a small crystal and the beta rays produced upon the stopping of gamma rays will very likely escape from the crystal without producing any large amount of ionization. Therefore, large current pulses will be produced by the alpha particles or fission fragments whereas gamma rays produce only small pulses. These pulses from gamma rays may be so small as to be below the noise level of the amplifiers used and therefore have no effect on the recorder. If a somewhat larger crystal is used, the gamma rays may produce current pulses above the noise level of the amplifiers; however these may still be disregarded by discriminator 18.

Figures 8, 9:
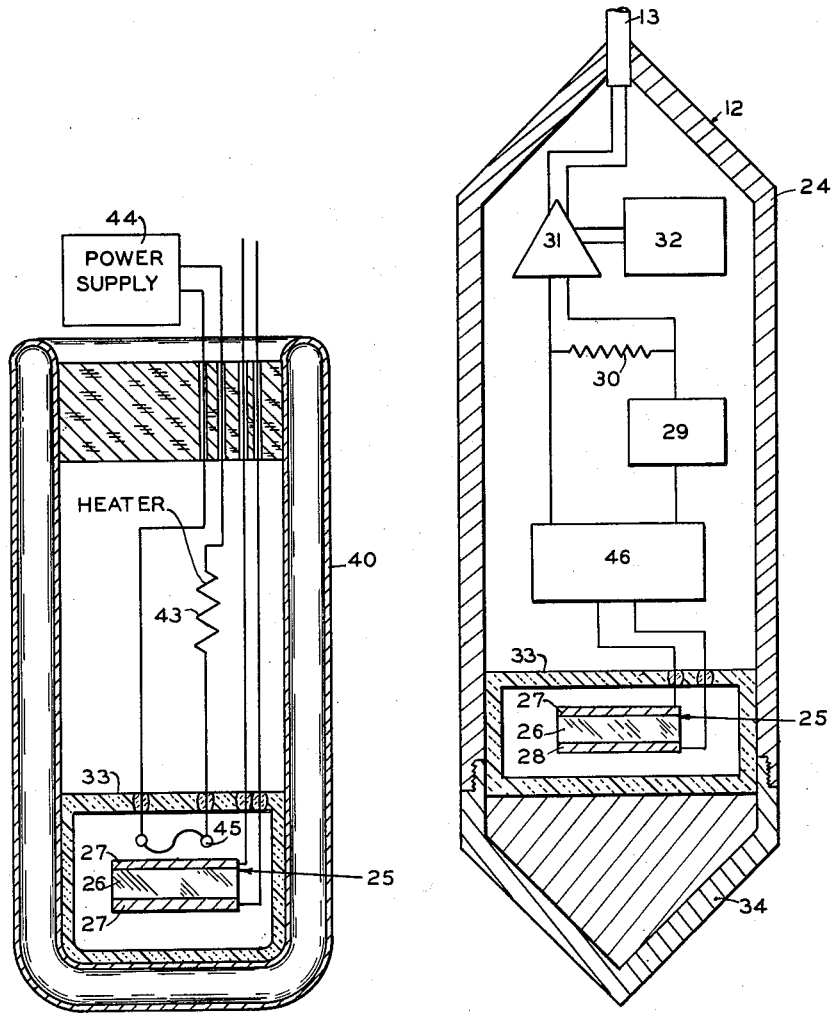
Figure 8 shows a modified form of temperature control.
Figure 9 shows a means for depolarizing the conduction counter.

As explained above, the evacuated space within wall 33 thermally insulates the crystal. All crystals are temperature sensitive and the magnitude of the pulses depends upon the temperature. Some of the crystals will not count at all at elevated temperatures. To improve the temperature characteristics of the crystal, a modified form of the invention may be used as shown in Figure 7. A spaced wall and jacket 40 such as a Dewar flask, may be placed outside wall 33. The spaced wall and jacket may be closed by insulating plug 41. Within the spaced wall and jacket may be placed a material 42, for example ice, to maintain a constant temperature. Other materials may be used to keep the crystal at the proper temperature, depending upon what temperature is desired. In cases where the crystal can withstand a high temperature, it is easier to maintain the crystal at a temperature higher than any encountered in a well rather than to try to cool the crystal, when the instrument is being operated in a hot well. This may be accomplished as shown in Figure 8. A heating element 43 is used instead of material 42 shown in Figure 7. This heating element is energized from power supply 44. A thermostat element 45, such as a bimetallic spring, is mounted adjacent the counter 25 and energizes or de-energizes the heating element 43 to maintain a constant temperature at the counter.

A further problem with the crystal conduction counter is the polarization of the crystals with use. When the crystals are ionized, some of the electrons formed are trapped in the crystal, and a charge accumulates which offsets the field applied to plates 27 and 28 and causes the pulses to decrease in size. The counter thereby becomes inefficient. It thereupon becomes necessary to depolarize the crystal. This may be accomplished by heating the crystal, flashing a light upon the crystal, or by changing the polarity of the plates 27 and 28 from time to time in order that the accumulated charge may aid the field. These steps may be taken when the instrument is returned to the surface at the end of a log, or they may be taken while the instrument is in the well. Some crystals become conductive during the time when they are heated and must therefore be cooled down again before they can be used for counting. However, crystals such as the diamond which count at elevated temperatures may be maintained at an elevated temperature by the method described in connection with Figure 8, whereby the crystals may be depolarized by the heat at the same time they are counting.

Alternatively, the polarity of the plates 27 and 28 may be changed periodically by the device shown in Figure 9. A switching device 46 is placed in the voltage leads to plates 27 and 28. Device 46 may be a commutator timed mechanically or electrically so that the plate 27 is first positive and then negative for equal periods of time. Since on the average there will be as many counts with plate 27 positive as with plate 28 positive, no charge will accumulate in the crystal and there will be no accumulating polarizing effect. When the polarity is reversed on the neutron counters as shown in Figures 5 and 6 the counters will no longer count well for the electrons will be freed near the positive plate and only a small current will be produced. When it is desired to provide for depolarization of neutron counters by reversing polarity, it will be necessary to provide for a coating 39 on both plates 27 and 28. This, of course, means that half of the neutron counts will arise from capture at the wrong plate. These counts will be small pulses and may be confused with gamma ray pulses; therefore, it will be desirable to adjust discriminator 18 to eliminate the smaller pulses caused by the neutron counts arising from neutron capture by a neutron capturing material 39 at the positive plate.

It is to be understood that this invention is not to be limited to the specific modifications described, but is to be limited only by the following claims.

I claim:

1. A method of radioactivity well-logging that comprises traversing the formations penetrated by a well with an electrically insulating liquid, that is adapted to conduct electricity when bombarded by penetrating radiation, to subject the liquid to penetrating radiation; applying an electric field across said liquid; and measuring the current pulses produced as an indication of a physical property of the formations.

2. A method of radioactivity well-logging that comprises traversing the formations penetrated by a well with an electrically insulating solid, that is adapted to conduct electricity when bombarded by penetrating radiation, to subject the solid to penetrating radiation; applying an electric field across said solid; and simultaneously maintaining said solid at an elevated temperature to depolarize said solid.

3. An apparatus for making a radioactivity log of a well that comprises in combination a subsurface instrument adapted to traverse a deep narrow well; means for traversing the well with said instrument; an electrically insulating solid, that is adapted to conduct electricity when bombarded by penetrating radiation, confined within said instrument; a source of voltage; means for applying said voltage across said solid; means for thermally insulating said solid from the thermal conditions in said well; a heater element for maintaining said solid at a constant temperature; a thermostatic control for said heater; and means for measuring current pulses through said solid as a measure of the penetrating radiations impinging upon said solid.

4. An apparatus for making a radioactivity log of a well that comprises in combination a subsurface instrument adapted to traverse a deep narrow well; means for traversing the well with said instrument; an electrically insulating solid, that is adapted to conduct electricity when bombarded by alpha particles, confined within said instrument; at least two conductive plates disposed adjacent said solid on opposite sides of said solid; neutron reactive material disposed adjacent at least one of said plates made thin enough to pass alpha particles from said neutron reactive material, said neutron reactive material being selected from the group consisting of boron and lithium; a source of voltage; means for applying said voltage between at least two of said plates on opposite sides of said solid; means for discriminating in favor of current pulses produced by the alpha particles released by said neutron reactive material, said discriminating means comprising said solid being thick enough to stop said alpha particles but so thin as to stop beta particles only when said beta particles are of such low energy as to produce substantially less ionization in said solid than said alpha particles; and means for measuring current pulses through said solid as a measure of the neutrons impinging upon said neutron reactive material.

5. An apparatus for making a radioactivity log of a well that comprises in combination a subsurface instrument adapted to traverse a deep narrow well; means for traversing the well with said instrument; an electrically insulating solid, that is adapted to conduct electricity when bombarded by alpha particles, confined within said instrument; at least two conductive plates disposed adjacent said solid on opposite sides of said solid; neutron reactive material disposed adjacent at least one of said plates made thin enough to pass alpha particles from said neutron reactive material, said neutron reactive material being selected from the group consisting of boron and lithium; a source of voltage; means for applying said voltage between at least two of said plates on opposite sides of said solid; means for discriminating in favor of current pulses produced by the alpha particles released by said neutron reactive material, said discriminating means comprising said solid being of the order of 0.2 mm. thick; and means for measuring current pulses through said solid as a measure of the neutrons impinging upon said neutron reactive material.

6. An apparatus for making a radioactivity log of a well that comprises in combination a subsurface instrument housing adapted to traverse a deep narrow well; means for traversing the well with said instrument housing; a normally electrically insulating material confined in a condensed state within said instrument housing, said insulating material being adapted to conduct electricity when bombarbed by alpha particles; neutron reactive material so disposed relative to said insulating material that alpha particles therefrom may reach said insulating material, said neutron reactive material being selected from the group containing boron and lithium; at least two electrodes disposed in said housing with said insulating material therebetween and spaced such that there is a thickness of insulating material between said electrodes which is enough to stop said alpha particles but so little as to stop beta particles only when said beta particles are of such low energy as to produce substantially less ionization in said insulating material than said alpha particles; a source of voltage; means for applying said voltage between at least two of said spaced electrodes; and means for measuring current pulses through said insulating material as a measure of the neutrons impinging upon said neutron reactive material.

References Cited in the file of this patent

UNITED STATES PATENTS

| | | |
|---|---|---|
| 2,189,122 | Andrews | Feb. 5, 1940 |
| 2,508,772 | Pontecorvo | May 23, 1950 |
| 2,543,039 | McKay | Feb. 27, 1951 |
| 2,543,676 | Thayer et al. | Feb. 27, 1951 |
| 2,547,173 | Rittner | Apr. 3, 1951 |
| 2,584,138 | Lichtman | Feb. 5, 1952 |
| 2,604,596 | Ahearn | July 22, 1952 |
| 2,636,994 | Neufeld | Apr. 28, 1953 |

OTHER REFERENCES

"On the Conductivity Produced in CdS Crystals by Irradiation With Gamma-Rays," by Rudolf Freirichs, Physical Review, vol. 76, No. 12, Dec. 15, 1949, pp. 1869–1875. (Copy in Scientific Library.)